US007195823B2

(12) United States Patent
Sanders et al.

(10) Patent No.: US 7,195,823 B2
(45) Date of Patent: Mar. 27, 2007

(54) DELIVERY SYSTEM FOR SUPPLEMENTAL WOOD PRESERVATIVE AND/OR METAL CORROSION INHIBITION TREATMENT

(75) Inventors: Michael G. Sanders, Sturgis, MS (US); Terry L. Amburgey, Sturgis, MS (US); H. Michael Barnes, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 469 days.

(21) Appl. No.: 10/465,882

(22) Filed: Jun. 20, 2003

(65) Prior Publication Data

US 2004/0018331 A1 Jan. 29, 2004

Related U.S. Application Data

(60) Provisional application No. 60/390,594, filed on Jun. 20, 2002.

(51) Int. Cl.
*B32B 21/06* (2006.01)

(52) U.S. Cl. .................. 428/535; 428/536; 428/537.1; 427/336; 427/440; 427/541

(58) Field of Classification Search ................ 428/535, 428/536, 537.1; 427/336, 440, 541
See application file for complete search history.

(56) References Cited

U.S. PATENT DOCUMENTS

| | | | | |
|---|---|---|---|---|
| 4,731,267 | A | 3/1988 | Makus et al. | |
| 4,799,735 | A | 1/1989 | Meyer | |
| 5,200,457 | A * | 4/1993 | Vasishth et al. | 524/437 |
| 5,236,711 | A * | 8/1993 | Ostby et al. | 424/409 |
| 5,540,954 | A * | 7/1996 | Nicholas et al. | 427/427.7 |
| 5,591,263 | A | 1/1997 | Chin et al. | |
| 5,697,414 | A * | 12/1997 | Amburgey et al. | 144/361 |
| 5,997,971 | A | 12/1999 | Wall et al. | |

OTHER PUBLICATIONS

Forsyth, et al., "Performance of Groundline Bandage Remedial Treatments in Western U.S. Species Transmission Poles", The International Research Group on Wood Preservation Document No. IRG/WP 93-30019, 1993.
McCarthy, et al., "Evaluation of a Solid Remedial Wood Preservative Containing Boron and Flourine", The International Research Group on Wood Preservation Document No. IRG/WP 93-30022, 1993.
Sonti, et al., "Study on the Treatment of Construction Timbers by Diffusion Methods", The International Research Group on Wood Preservation Document No. IRG/WP/3252, 1983.
Graham, R.D., "Preventing and Stopping Internal Decay of Douglas Fir Poles", Holzforschung, 27(5); 168-173, 1973.
Orsler, et al., "The Rate of Redistribution of Loss of Leachable Preservations Under Service Conditions", The International Research Group on Wood Preservation Document No. IRG/WP 93-30026, 1993.
Hegarty, et al., "The Influence of Timber Species and Preservative Treatment on Sport Germination of Some Wood-Destroying Basidiomycetes," The International Research Group on Wood Preservation Document No. IRG/WP/2300, 1988.

* cited by examiner

*Primary Examiner*—Leszek Kiliman
(74) *Attorney, Agent, or Firm*—DLA Piper US LLP

(57) ABSTRACT

The present invention comprises a porous pad impregnated with wood preservative(s) and/or metal corrosion inhibitor(s) to which future maintenance treatments can be applied. These pads are designed to be placed within joints of wood, metal or combinations thereof for protection against biotic and/or abiotic deterioration. The pad can be placed between joints of wood and/or metal members.

11 Claims, 3 Drawing Sheets

DELIVERY SYSTEM FOR SUPPLEMENTAL WOOD PRESERVATIVE AND/OR METAL CORROSION INHIBITION TREATMENT

This application claims priority from U.S. Provisional Application Ser. No. 60/390,594, filed Jun. 20, 2002. The entirety of that provisional application is incorporated herein by reference.

This invention was made with Government support under DTFH61-97-C-00082 awarded by the U.S. Department of Transportation. The Government may have certain rights in the invention.

BACKGROUND OF THE INVENTION

1. Field of the Invention

This invention relates to the field of preservation and more particularly to the protection and preservation of the joints of wood or metal, or combinations thereof.

2. Related Art

U.S. Pat. No. 4,731,267 discloses a wrap designed for the delivery of wood preservative for use around wood poles, posts, and the like. The wrap uses pads which contain the wood preservative for the ground-line treatment of the articles that the device is wrapped around. This delivery system works well for preventing deterioration in wood at ground-line.

U.S. Pat. No. 4,779,735 discloses a package that is used for the delivery of wood preservative using a flexible sheet with a perforated sheet which the preservative can flow through. The package is attached around poles for preserving the wood around the ground-line.

U.S. Pat. No. 5,591,263 discloses a package that is used for the delivery of wood preservative using a matrix that contains solid tablets of wood preservative chemical. The package is attached around poles for preserving the wood around the ground-line and can be cut into the proper size because of the S solid tablets that are contained in the matrix.

U.S. Pat. No. 5,997,971 discloses a package that is used for the delivery of wood preservative using a matrix that contains liquid wood preservative chemical. The package is attached around poles for preserving the wood around the ground-line and can be cut into the proper size because of the pockets contained in the matrix.

The disclosed structures in U.S. Pat. Nos. 4,731,267, 4,779,735, 5,591,263, and 5,997,971 were suited for use around the ground-line to prevent the deterioration of poles and such. This invention is used to stop the deterioration of the wood within joints of wood and/or metal members whereas wraps are only used for the treatment of a pole at ground level. The current invention is more flexible in its use and application because it can be fitted between the joints.

U.S. Pat. No. 5,236,711 discloses a preservative-bearing pad for use between the adzed surface of a wooden railroad cross-tie and the tie plate. The pad contains a water-soluble fungicide that is leached at a controlled rate as water contacts it. The pad is designed to be biodegradable and replaced during regular maintenance intervals.

Other References

Forsyth, et al., (1993) "Performance of Groundline Bandage Remedial Treatments in Western U.S. Species Transmission Poles," The International Research Group on Wood Preservation Document No. IRG/WP 93-30019.

McCarthy, et al., (1993) "Evaluation of a Solid Remedial Wood Preservation Containing Boron and Fluorine," International Research Group on Wood Preservation Document No. IRG/WP 93-30022.

Sonti, et al., (1983) "Study on the Treatment of Construction Timbers by Diffusion Methods," International Research Group on Wood Preservation Document No. IRG/WP/3252.

Graham, R. D., (1973) "Preventing and Stopping Internal Decay of Douglas Fir Poles," Holzforschung 27(5): 168–173.

Orsler, et al., (1993) "The Rate of Redistribution and Loss of Leachable Preservations Under Service Conditions," International Research Group on Wood Preservation Document No. IRG93-30026.

Hegarty, et al., (1988) "The Influence of Timber Species and Preservative Treatment on Spore Germination of Some Wood-Destroying Basidiomycetes" International Research Group on Wood Preservation Document No. IRG/WP/2300.

All documents cited herein are incorporated by reference for all purposes.

BACKGROUND OF THE TECHNOLOGY

Wood and metal surfaces are subject to degradation by a variety of means including fungal attack, corrosion, insects, etc causing biotic and/or abiotic deterioration. Highway bridges are no exception whether they are constructed of wood, concrete, steel, or a combination of materials. Bridges are subjected to a variety of biological and/or physical agents of deterioration. Critical areas are joints, fasteners points, checks and splits, and tops of timber piles.

A wide variety of approaches are described in the prior art to minimize these causes of degradation. Wood can be protected by injecting preservatives into the internal voids, supplemental ground-line treatments can be used to further protect the wood. Some treatments require drilling holes in the wood followed by injection of additional preservatives into the cavity.

It will be appreciated by those skilled in the art that the present invention provides a novel means for protecting wood or metal surfaces at joints through continuous application of wood preservatives for wood components or corrosion inhibitors for metal components, or combinations thereof, without additional drilling of holes or unsightly wraps.

SUMMARY OF THE INVENTION

The invention is generally directed to a porous pad comprising an absorbent matrix material impregnated with at least one protective substance that is a wood preservative or a metal corrosion inhibitor, wherein the pad is designed to be placed within a joint between members made with wood, metal or combinations thereof for protection against biotic or abiotic deterioration within the joint. An object is such a pad being placed within a joint between two or more members, wherein the members comprise wood, metal and combinations thereof. Another object is that the pad after depletion of protective substance can be reactivated with additional amounts of protective substance(s). Still another object is such a pad having a water repellant combined with other protective substances. Yet still another object is a method of preserving the wood or metal of a member or fastener near an interface of a joint, said method comprising: providing a porous pad comprising an absorbent matrix material impregnated with at least one protective substance that is a wood preservative or a metal corrosion inhibitor, wherein the pad is designed to be placed within a joint between members made with wood, metal or combinations thereof for protection against biotic or abiotic deterioration within the joint; placing the pad on a surface of a first member in forming the joint; positioning an opposing member, optionally with a fastener, to form a joint at the interface between the first member and the opposing second member wherein the pad is held in the interface between the first and second member; and joining the first and second member to form a joint.

BRIEF DESCRIPTION OF THE INVENTION

The present invention comprises a porous pad impregnated with wood preservative(s) and/or metal corrosion inhibitor(s) to which future maintenance treatments can be applied. These pads are designed to be placed within joints of wood, metal or combinations thereof for protection against biotic and/or abiotic deterioration. The pad can be placed between joints of wood and/or metal members. It is a porous pad that does not have to be replaced, but can be reactivated with preservative, consequently extending the life of the joint, any fastener and the pad itself.

DESCRIPTION OF THE FIGURES

The foregoing summary, as well as the following detailed description, will be better understood when read in conjunction with the appended drawings. For the purpose of illustrating the invention, there is shown in the drawings an embodiment which is presently preferred, it being understood, however, that this invention is not limited to the precise arrangements and instrumentalities shown.

DETAILED DESCRIPTION OF THE INVENTION

Figure 1:
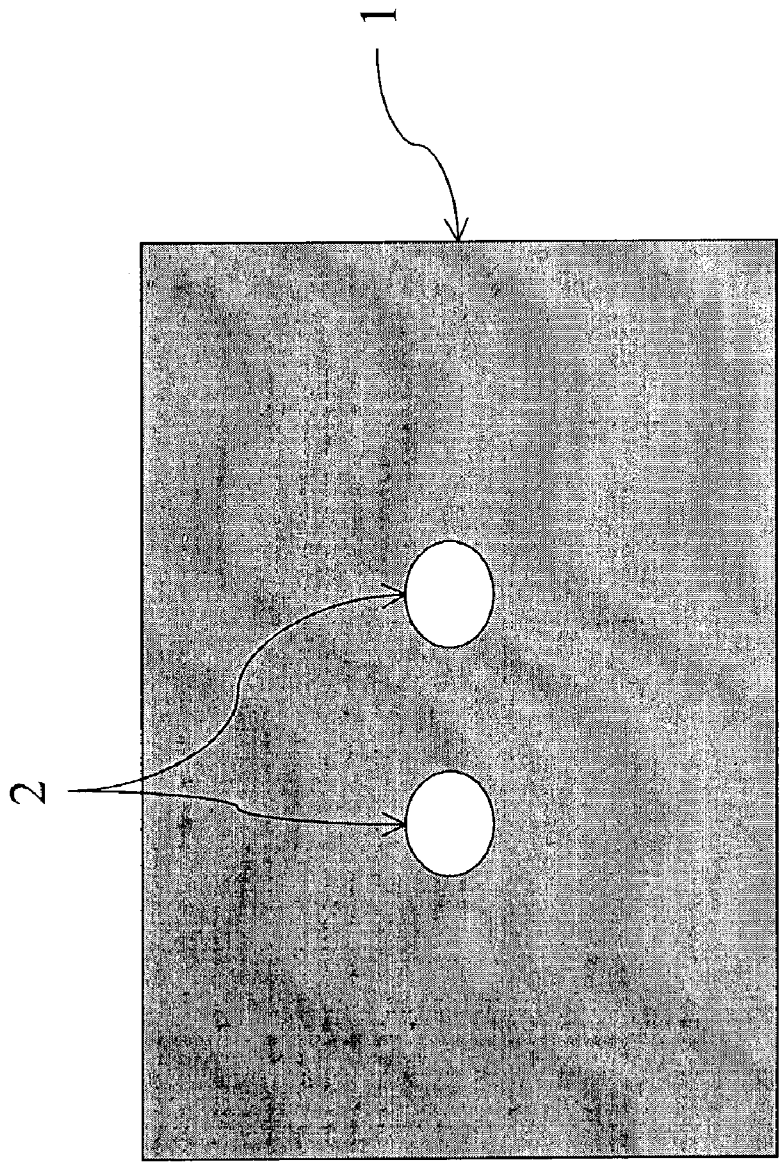
FIG. 1 is a forward view of a pad with holes for mounting.

While this invention is satisfied by embodiments in many different forms, there will herein be described in detail preferred embodiments of the invention, with the understanding that the present disclosure is to be considered as exemplary of the principles of the invention and is not intended to limit the invention to the embodiments illustrated and described. Numerous variations may be made by persons skilled in the art without departure from the spirit of the invention.

The invention is directed to materials and method for preserving the members where they are joined. The members are preserved by placing an absorbent pad, made from one or more porous materials that can be either biodegradable or non-biodegradable, but preferably is non-biodegradable. One such non-biodegradable material is fleece, and can be an industrial grade fleece. Other matrix materials are latex or sodium silicate. The members joined can be any combination of wood or metal.

Many protective treatments have been developed for the protection of wood or metal members. Especially suitable are boron-rich compounds, by which is meant compounds having a content of combined boron equivalent to more than 25%, preferably more than 35%, by weight $B_2O_3$. Examples of such compounds are boric oxide itself, boric acid, borax (sodium tetraborate decahydrate), borax pentahydrate, anhydrous borax, and various potassium and ammonium borates. Another such compound, which has been widely used for the preservation of wood members and which is a preferred active ingredient in the present invention, is disodium octaborate, a water-soluble powder of the approximate composition $Na_2B_8O_{13}$ $4H_2O$. This is available in the United Kingdom under the Registered Trade Mark "Timbor" and in the United States of America under the Trade Mark "Polybor". Borate materials can function variously as a wood preservative, a fungicide, an insecticide or as a corrosion inhibitor. Other corrosion inhibitors for oxidizable metals such as iron, mild steel, galvanized steel and stainless steel are well known by those of ordinary skill in the art. These metals are commonly used in members to be joined or in fasteners for the joints.

Other active compounds for inhibiting the effects of insects and/or fungus on wood can be used, in substitution for, or in combination with a corrosion inhibitor compound. Also, one compound may have properties that provide for a combination of functions. For instance, copper napthenate can act as a insecticide or as a fungicide for wood.

The amount of active compound and combinations employed depends on the nature and the occurrence of the microorganisms, and the expected microbial count and on the medium. The optimal amount can be determined in each case on use, using test series based on the level of absorption into the pad and the surface area of the wood to be protected. Wood members are especially vulnerable at the end-grain exposure. The end-grain exposure is particularly well protected using the pads of the invention. Metal fasteners are also surprisingly well-preserved.

The formulations mentioned can be prepared in a manner known per se, for example by dissolving the active compounds in a solvent or diluent and, if appropriate, further auxiliaries such as emulsifiers, or by emulsifying emulsifier-containing organic solutions in water. Suitable solvents or diluents are organochemical solvents or solvent mixtures and/or a polar organic solvent or solvent mixture and/or an oily or oil-type organochemical solvent or solvent mixture and/or water with at least one emulsifier and/or wetting agent. Unpolar organochemical solvents or solvent mixtures which are employed are oily or oil-type solvents with low volatility such as mineral oils or mineral oil-containing solvent mixtures, white spirit, petroleum and/or alkylbenzene.

Polar organochemical solvents which are employed are solvents or solvent mixtures which contain hydroxyl, ester, ether, or keto groups, preferably dibutyl phthalate or butyl benzoate. Other substances which can additionally be used are ester alcohols such as, for example, 2,2,4-trimethylpentanediol monoisobutyrate and/or other ester alcohols having a similar structure.

Emulsifiers or emulsifier mixtures which arrive are non-ionic emulsifiers such as, for example, alkyl polyglycol ethers or alkylaryl polyglycol ethers or anionic emulsifiers such as, for example, alkylbenzenesulfonic acids or salts of the alkylbenzenesulfonic acids or alkylcarboxylic acids such as stearic acid or ricinoleic acid or their alkali metal salts or ammonium salts or mixtures of different non-ionic and or anionic emulsifiers. Mixtures of dodecylbenzene sulfonates with ricinoleates are preferably used.

Other fungicides, insecticides or other active compounds can be added to the active compound combinations according to the invention, the agents, concentrates or quite generally formulations which can be prepared therewith, to increase the spectrum of action or to achieve specific effects. Suitable components for mixtures are, for example, the following compounds: Sulfenamides such as dichlorofluanide, tolylfluanide, folpet, fluorofolpet; benzimidazoles such as carbendazime, benomyl, fuberidazole, thiabendazole or their salts, thiocyanates such as thiocyanatomethylthiobenzothiazole, methylene bisthiocyanate; quaternary ammonium compounds such as benzyldimethyltetradecylammonium chloride, benzyldimethyldodecylammonium chloride, didecyldimethylammonium chloride; morpholino derivatives such as tridemorph, fenpropimorph, falimorph; azoles such as triadimefone, triadimenole, bitertanol, tebuconazole, propiconazole, azaconazole, hexaconazole, propchlorazo; iodine derivatives such as diiodomethyl p-tolyl sulfone, 3-iodo-2-propinylalcohol, 4-chlorophenyl-3-iodopropargyl-formal, 3-bromo-2,3-diiodo-2-propenyl ethylcarbonate 2,3,3-triiodoallylalcohol, 3-bromo-2,3-diiodo-2-propenylalcohol; bromine derivatives such as bronopol; Isothiazolinones such as N-methylisothiazolin-3-one, 5-chloro-N-methyl-isothiazolin-3-one, 4,5-dichloro-N-octylisothiazolin-3-one, N-octyl-isothiazolin-3-one; benzisothiazolinones, cyclopenteneisothiazolinones; pyridines such as 1-hydroxy-2-pyridinethione (and their Na, Fe, Mn and Zn salts), tetrachloro-4-methylsulfonylpyridine; metallic soaps such as tin naphthenate, tin octoate, tin 2-ethylhexanoate, tin oleate, tin phosphate, tin benzoate, copper napthenate, copper octoate, copper 2-ethylhexanoate, copper oleate, copper phosphate, copper benzoate, zinc naphthenate, zinc octotate, zinc 2-ethylhexanoate, zinc oleate, zinc phosphate and zinc benzoate; oxides such as tributyltin oxide, $Cu_2$ O, CuO, ZnO; dialkyldithiocarbamates such as Na and Zn salts of dialkyldithiocarbamates, tetramethylthiuram disulfide; nitriles such as 2,4,5,6-tetrachloroisophthalodi nitrile; benzothiazoles such as 2-mercaptobenzothiazole; quinolines such as 8-hydroxyquinoline; boron compounds such as boric acid, boric esters, borax; formaldehyde-releasing compounds such as benzyl alcohol mono (poly)-hemiformal, oxazolidines, hexahydro-S-triazines, N-methylolchloroacetamide; tris-N-(cyclohexyldiazeniumdioxy)-aluminium, N-(cyclohexyldiazeniumdioxy)-tributyltin or K' salts, bis-N-(cyclohexyldiazeniumdioxy)-copper; and carbonic acids such as benzoic acid, sorbinic acid, 2-Ethylhexanoic acid as well as their alkali- and earth-alkali-salts.

Insecticides which can be added are: phosphoric esters such as azinphos-ethyl, azinphosmethyl, 1-(4-chlorophenyl)-4-(O-ethyl, S-propyl)-phosphoryloxypyrazole, chloropyrifos, coumaphos, demeton, demeton-S-methyl, diazinone, dichlorvos, dimethoate, ethoprophos, etrimfos, fenitrothion, penthion, heptenophos, parathion, parathion-methyl, phosalone, phoxim, pirimiphos-ethyl, pirimiphos-methyl, profenofos, prothiofos, sulfprofos, triazophos and trichlorophone; Carbamates such as aldicarb, bendiocarb, 2-(1-methylpropyl) phenyl methyl carbamate, butocarboxim, butoxycarboxim, carbaryl, carbofuran, carbosulfan, cloethocarb, isoprocarb, methomyl, oxamyl, pirimicarb, promecarb, propoxur and thiodicarb; pyrethroids such as allethrin, alphamethrin, bioresmethrin, byfenthrin, cycloprothrin, cyfluthrin, decamethrin, cyhalothrin, cypermethrin, deltamethrin, alpha-cyano-3-phenyl-2-methylbenzyl 2,2-dimethyl-3-(2-chloro-2-trifluoro-methylvinyl)cyclopropanecarboxylate, fenpropathrin, fenfluthrin, fenvalerate, flucythrinate, flumethrin, fluvalinate, permethrin, resmethrin and tralomethrin; nitroimines and nitromethylenes such as 1-[(6-chloro-3-pyridinyl)-methyl]-4,5-dihydro-N-nitro-1H-imidazol-2-amine(imidacloprid).

While the preservatives described above exhibit biocidal properties with respect to microorganisms such as molds and fungus, other biocides (e.g., insecticides) can also be included in the preservative composition. Suitable insecticides for use in wood preservatives are those having a biocidal effect on xylophagous insects such as, for example, termites, wood eating ants, Capricorn beetles, deathwatch beetles, powder post beetles, and like insects. Exemplary insecticides include DDT (dichlorodiphenyl-trichloroethane), methoxychlor (2,2'-bis(4-methoxyphenyl)-1,1,1-trichloroethane), lindane (gamma isomer of hexachlorocyclohexane), chlordane (octachlorohexahydromethanoindene), aldrin (endo hexachlorohexahydrodimethanonaphthalene), toxaphene, ethion (O,O,O',O'-tetraethyl-S,S'-methylenedithiophoshate), parathion (O,O-diethyl-O-paranitrophenyl thiophosphate), phosalone (O,O-diethyl-3-dithiophosporyl-methyl-6-chlorobenzoxazolone), sevin (1-naphtyl N-methylcarbamate), carbofuran (dimethyl-dihydrobenzofuryl N-methylcarbamate), decamethrin (alpha-cyanophenoxybenzyldibromovinyl-dimethylcyclopropane-carboxylate), cypermethrin (phenoxybenzyl cis-transdimethyldichlorovinylcyclopropane-carboxylate), and fenvalerate (alpha-cyanophenoxybenzyl chlorphenyl-methylbutylbutyrate), and sodium fluoride for example.

Agents or concentrates contain the active compound mixtures according to the invention in a concentration of from 0.01 to 80% by weight, and, if appropriate, 0.001 to 10% by weight of a suitable other fungicide or insecticide. The variety of applications in which the active agents for preserving the joined members according to the invention can be applied is not in any way limited. Surprisingly, it has been found that when preserving agents are combined with a water-repellant substance, the preserving effect on the members, and fasteners for the members, can be remarkably extended. Water repellant substances can be any hydrophobic material know to those of ordinary skill in the art. Suitable water repellants include either water soluble or emulsifiable versions of the following: mineral spirits, wax, paraffin and/or acrylate dispersions, silicones, fatty acid salts (such as, for example, calcium, magnesium or aluminum stearate), polyurethanes, alkyl biphenyls, fatty alcohols, hydrocarbon waxes, phosphated glycerides, PVP copolymers, and ethylene and propylene homopolymers.

A series of field exposure tests were used to assess treatments, delivery systems, and treatment methodologies. Emphasis was placed on systems which are more environmentally benign and do not require certification for use. Species and materials for testing were chosen to cover the expected range in properties found with timber bridge materials so that the data could be applied to non-tested species/materials.

Table 1 demonstrates different embodiments of the invention.

TABLE 1

Data from Trial Studies: Evaluation of Wooden Joint Members

| Species | # | Aug-99 Rating | Sep-00 Rating | Apr-02 Rating | Treatment | Group Ave. | Group Ave. | Group Ave. |
|---|---|---|---|---|---|---|---|---|
| syp | 211 | 0 | 3 | 4 | unt/felt | 0.0 | 1.6 | 2.8 |
| | 212 | 0 | 3 | 3 | | | | |
| | 213 | 0 | 0 | 3 | | | | |
| | 214 | 0 | 0 | 0 | | | | |
| | 215 | 0 | 2 | 4 | | | | |
| yp | 100 | 1 | 3 | 4 | unt/felt | 1.2 | 3.0 | 3.6 |
| | 99 | 1 | 1 | 2 | | | | |
| | 98 | 2 | 4 | 4 | | | | |
| | 97 | 2 | 4 | 4 | | | | |
| | 96 | 0 | 3 | 4 | | | | |
| ro | 156 | 0 | 3 | 3 | unt/felt | 0.0 | 2.0 | 2.0 |
| | 157 | 0 | 0 | 0 | | | | |
| | 158 | 0 | 3 | 3 | | | | |
| | 159 | 0 | 2 | 2 | | | | |
| | 160 | 0 | 2 | 2 | | | | |
| yp | 116 | 0 | 0 | 0 | Cunap/felt | 0.0 | 0.8 | |
| | 117 | 0 | 0 | 0 | | | | |
| | 119 | 0 | 0 | 0 | | | | |
| | 118 | 0 | 0 | 2 | | | | |
| | 120 | 0 | 0 | 2 | | | | |
| syp | 191 | 0 | 0 | 3 | Cunap/felt | 0.0 | 0.0 | 1.0 |
| | 192 | 0 | 0 | 0 | | | | |
| | 193 | 0 | 0 | 1 | | | | |
| | 194 | 0 | 0 | 1 | | | | |
| | 195 | 0 | 0 | 0 | | | | |
| ro | 141 | 0 | 1 | 1 | Cunap/felt | 0.0 | 0.2 | 0.2 |
| | 142 | 0 | 0 | 0 | | | | |
| | 143 | 0 | 0 | 0 | | | | |
| | 144 | 0 | 0 | 0 | | | | |
| | 145 | 0 | 0 | 0 | | | | |
| ro | 131 | 0 | 0 | 0 | Cunap + WR/felt | 0.0 | 0.0 | 0.0 |
| | 132 | 0 | 0 | 0 | | | | |
| | 133 | 0 | 0 | 0 | | | | |
| | 134 | 0 | 0 | 0 | | | | |
| | 135 | 0 | 0 | 0 | | | | |
| yp | 121 | 0 | 0 | 0 | Cunap + WR/felt | 0.0 | 0.0 | 0.8 |
| | 122 | 0 | 0 | 1 | | | | |
| | 123 | 0 | 0 | 0 | | | | |
| | 124 | 0 | 0 | 3 | | | | |
| | 125 | 0 | 0 | 0 | | | | |
| syp | 196 | 0 | 0 | 0 | Cunap + WR/felt | 0.0 | 0.0 | 0.4 |
| | 197 | 0 | 0 | 1 | | | | |
| | 198 | 0 | 0 | 0 | | | | |
| | 199 | 0 | 0 | 0 | | | | |
| | 200 | 0 | 0 | 1 | | | | |

Rating System:
0 = Sound
1 = Signs of slight surface decay
2 = Small zones of obvious decay
3 = Extensive decay
4 = In danger of complete failure
5 = Failure
syp = southern yellow pine
yp yellow-poplar
ro red oak
unt/felt = untreated felt
Cunap/felt = Copper Naphthenate on felt
Cunap + VAVfelt = Cunap + water repellent (mineral spirits/paraffin wax) on felt Holes cut into wood after treatment expose untreated wood inside of the treated zone. In service, water enters the holes around fastener shanks and wets the interior untreated wood sufficiently to support the growth of decay fungi. Wood adjacent to fasteners also becomes degraded due to the accumulation of iron in the wood. Corrosion of fasteners usually accompanies this type of deterioration. The deterioration of the wood member and corrosion of the members or fasteners can be reduced with use of the treated pad.

The protective substances, such as wood preservative or corrosion inhibitor, can be combined advantageously with each other in various ratios varying in increments of 1 part in 100 parts of each part by weight from 1 part wood preservative(s) to 99 parts corrosion inhibitor(s), to 99 parts wood preservative(s) to 1 part corrosion inhibitor(s). Similarly the protective substance(s), generally, can be combined with water repellant substance(s) can be combined advantageously with each other in various ratios varying in increments of 1 part in 100 parts of each part by weight from 1 part protective substance(s) to 99 parts water repellant(s), to 99 parts protective substance(s) to 1 part water repellant(s).

DETAILED DESCRIPTION OF EMBODIMENTS

Referring to FIG. 1, one embodiment of the pad generally identified by reference numeral 1 is shown. The pad has holes 2 for mounting in between joints of wood and/or metal members or between a wood or metal member and a fastener.

Figure 2:
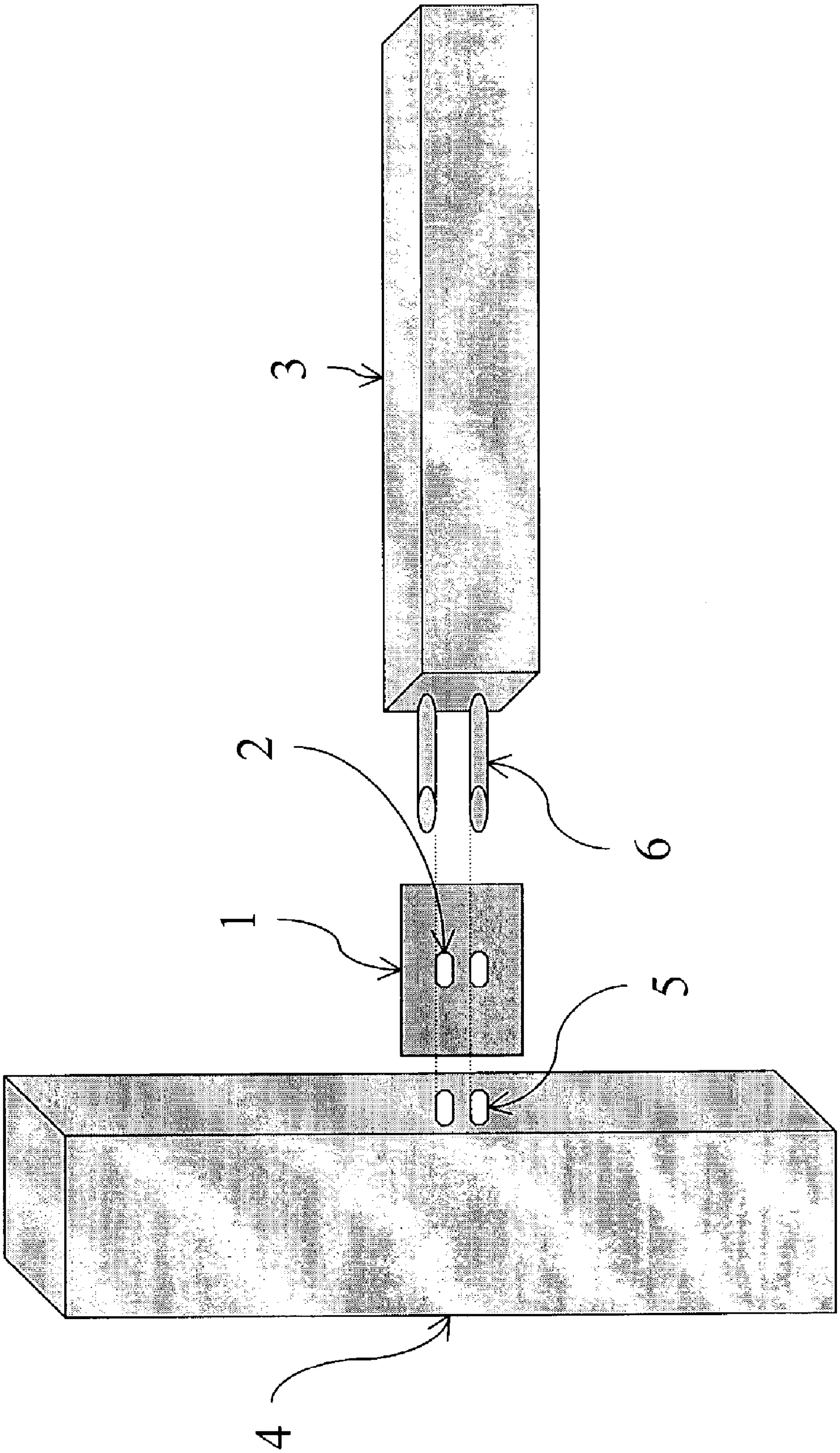
FIG. 2 is a diagrammatic view showing the pad placed within a joint of pieces of wood and/or metal members.

Referring to FIG. 2, one embodiment of the pad 1 is shown. The first wood or metal member 4 is shown with mounting holes 5. The second wood or metal member 3 is shown with mounting bolts 6. The first member 3 is attached to second member 4 by inserting the bolts 6 of second member 4 through the holes 2 of the pad 1 then through the holes 5 of the first member 4.

Figure 3:
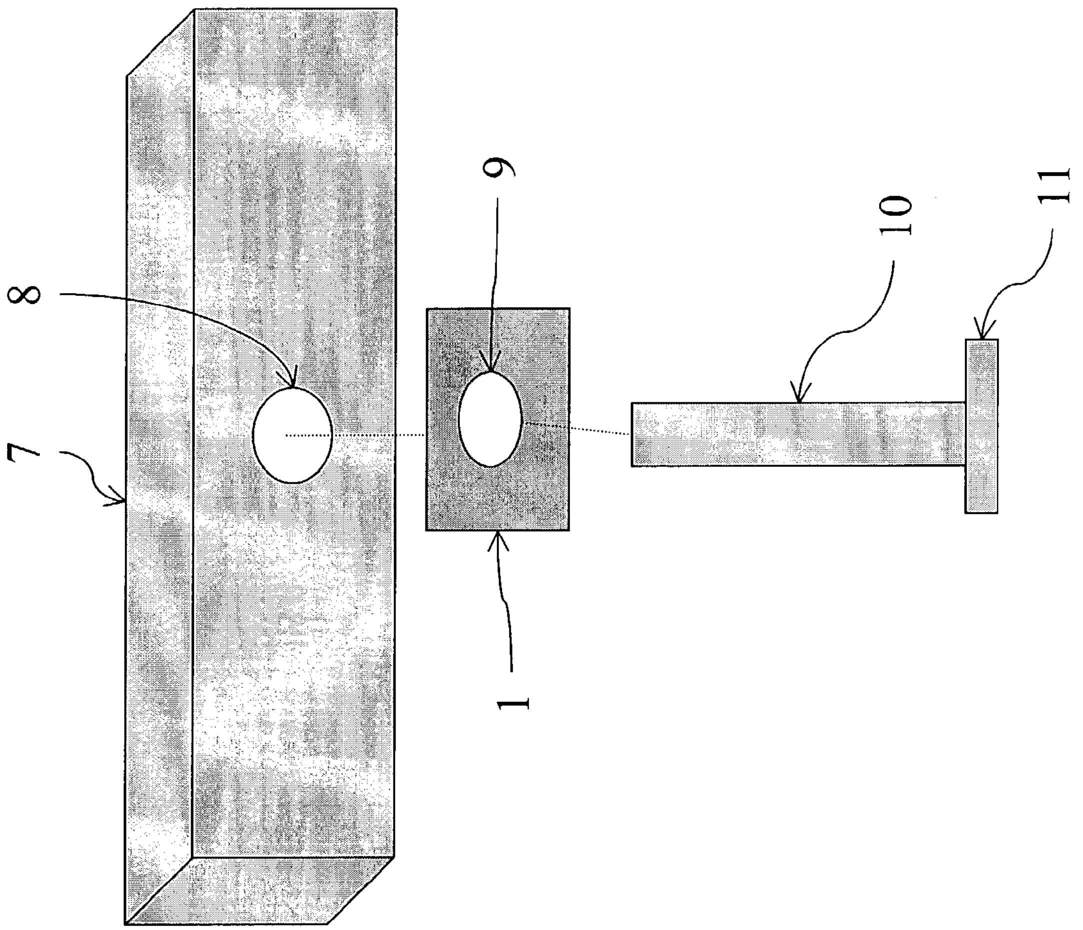
FIG. 3 is a diagrammatic view showing a pad placed between a piece of wood or metal member and fastener.

Referring to FIG. 3, another embodiment is a pad 1 that is placed between a wood or metal member 7 and a fastener 10. The fastener 10 is placed through the hole 9 in the pad 1 and then through the hole 8 in the wood or metal member 7. The pad 1 is designed such that it remains in place between the head of the fastener 11 and the wood or metal member 7.

In another embodiment, the pad 1 is felt or any type of absorbent fabric or material. In another embodiment, the pad 1 is treated with preservatives comprising fumigants, solvent-borne preservatives, water-repellent preservative formulations, diffusible preservative rods, waterborne preservative, solvent-borne copper napthenate, solvent-borne copper napthenate plus water repellent and paste for the preservation of the wood and/or metal members. According to this or other embodiments, the fastener 11 is comprising carbon steel, iron, aluminum, carbon alloy steel, brass, and stainless steel, mild steel, stainless steel, galvanized steel or non-galvanized steel.

The members joined may be a wood member or a metal member. The wood member may be made, for instance, from pine or other conifers, dense hardwood, yellow-poplar, oak, engineered composites, and medium-dense hardwood. A metal member can, for instance, comprise carbon steel, iron, aluminum, carbon alloy steel, brass, and stainless steel.

In another embodiment, the pad can be placed between joints of wood and/or metal members and reactivated with preservative from time to time thereby making such pad non-biodegradable and providing continued protection.

Preferred Embodiment

A felt pad is placed in the joint between wood, metal or combinations thereof for the preservation of the wood and/or metal including metal fasteners. The felt pad contains a preservative to prevent the deterioration of the wood and/or corrosion of the metal or fastener(s).

From the foregoing description, it can be seen that the present invention comprises a new and unique system for preserving joints and a method of making those systems and a product resulting therefrom. It will be recognized by those skilled in the art that changes could be made to the above-described embodiments of the invention without departing from the broad inventive concepts thereof. It is understood, therefore, that this invention is not limited to the particular embodiments disclosed, but is intended to cover all modifications which are within the spirit and scope of the invention and that this invention is not limited to the particular embodiments disclosed, but it is intended to cover any modifications which are within the spirit and scope of the present invention as defined by the appended claims.

What is claimed is:

1. A porous pad comprising an absorbent matrix material impregnated with at least one protective substance that is a wood preservative or a metal corrosion inhibitor, wherein the pad is designed to be placed within a joint between members made with wood, metal or combinations thereof for protection against biotic or abiotic deterioration within the joint, and wherein the matrix material is resistant to degradation, allowing the pad to be impregnated with the protective substance during the life of the joint.

2. the pad according to claim 1, wherein the pad is placed within a joint between two or more members, wherein the members comprise wood, metal or combinations thereof.

3. The pad according to claim 1, wherein the protective substance is a wood preservative.

4. The pad according to claim 1, wherein the protective substance is a corrosion inhibitor.

5. The pad according to claim 1, wherein a water repellant is combined with the protective substance impregnating the pad.

6. The pad according to claim 1, wherein when a wood preservative is sodium fluoride, a matrix material is not latex or sodium silicate.

7. A method of preserving the wood or metal of a member or fastener near an interface of a joint, said method comprising:

providing a porous pad comprising an absorbent matrix material impregnated with at least one protective substance that is a wood preservative or metal corrosion inhibitor, wherein the pad is designed to be placed within a joint between members made with wood, metal or combinations thereof for protection against biotic or abiotic deterioration within a joint;

placing the pad on a surface of a first member in forming the joint; positioning an opposing member, optionally with a fastener, to form a joint at the interface between the first member and the opposing second member wherein the pad is held in the interface between said first member and second member;

joining said first and second member and to form a joint; and reimpregnating the pad with the protective substance during the life of the joint.

8. The method according to claim 7, wherein the protective substance is a wood preservative.

9. The method according to claim 7, wherein the protective substance is a corrosion inhibitor.

10. The method according to claim 7, wherein a water repellant is combined with the protective substance.

11. The method according to claim 7, wherein when a wood preservative is sodium fluoride, a matrix material is not latex or sodium silicate.

* * * * *